US011845836B2

(12) United States Patent
Ruskeeniemi et al.

(10) Patent No.: US 11,845,836 B2
(45) Date of Patent: Dec. 19, 2023

(54) CROSS-LINKED PLASTOMERS AS A REPLACEMENT FOR RUBBER

(71) Applicant: BOREALIS AG, Vienna (AT)

(72) Inventors: Jari-Jussi Ruskeeniemi, Kulloo (FI); Jeroen Oderkerk, Stenungsund (SE); Oscar Prieto, Stenungsund (SE); Stefan Hellström, Stenungsund (SE); Tanja Piel, Linz (AT); Daniela Mileva, Linz (AT); Floran Prades, Linz (AT)

(73) Assignee: BOREALIS AG, Vienna (AT)

(*) Notice: Subject to any disclaimer, the term of this patent is extended or adjusted under 35 U.S.C. 154(b) by 171 days.

(21) Appl. No.: 17/276,724

(22) PCT Filed: Sep. 30, 2019

(86) PCT No.: PCT/EP2019/076341
§ 371 (c)(1),
(2) Date: Mar. 16, 2021

(87) PCT Pub. No.: WO2020/070034
PCT Pub. Date: Apr. 9, 2020

(65) Prior Publication Data
US 2022/0033588 A1 Feb. 3, 2022

(30) Foreign Application Priority Data

Oct. 2, 2018 (GB) .................................... 18198323

(51) Int. Cl.
*C08G 77/442* (2006.01)
*C08J 3/24* (2006.01)
(52) U.S. Cl.
CPC .............. *C08G 77/442* (2013.01); *C08J 3/24* (2013.01); *C08J 2383/10* (2013.01)
(58) Field of Classification Search
CPC ....... C08G 77/442; C08J 3/24; C08J 2383/10; C08F 2810/20; C08F 255/02; C08F 8/00
See application file for complete search history.

(56) References Cited

U.S. PATENT DOCUMENTS

| 4,297,310 | A | 10/1981 | Akutsu et al. |
| 4,351,876 | A | 9/1982 | Doi et al. |
| 4,397,981 | A | 8/1983 | Doi et al. |
| 4,413,066 | A | 11/1983 | Isaka et al. |
| 4,446,283 | A | 5/1984 | Doi et al. |
| 4,456,704 | A | 6/1984 | Fukumura et al. |
| 2013/0233383 | A1* | 9/2013 | Naumovitz ......... H01L 31/0481 136/259 |

FOREIGN PATENT DOCUMENTS

| EP | 10166636 B1 | 4/1989 |
| EP | 0756607 B1 | 6/1998 |
| JP | 2016-074832 | * 5/2016 |
| JP | 2016074832 A | 5/2016 |
| JP | 2017-222752 | * 12/2017 |
| JP | 2018104495 A | 7/2018 |
| JP | 2018154815 A | 10/2018 |
| WO | 2007008765 A2 | 1/2007 |
| WO | 2011153541 A1 | 12/2011 |

OTHER PUBLICATIONS

Translation of JP 2017-222752 (Year: 2017).*
Translation of JP2016-074832 (Year: 2016).*
Busico, Vincenzo, et al., "ALK-1-ENE Polymerization in the Presence of a Monocyclopentadienyl Zirconium(Iv) Acetamidinate Catalyst: Microstructural and Mechanistic Insights", Macromol. Rapid Commun. 2007, 28,1128-1137.
Busico, Vincenzo, et al., "Full Assignment of the 13C NMR Spectra or Regioregular Polypropylenes: Methyl and Methylene Region", Macromolecules 1997, 30, 6251-6263.
Busico, Vincenzo, et al., "Microstructure of Polypropylene", Prog. Polym. Sci. 26 (2001) 443-533.
Castignolles, Patrice, et al., "Detection and quantification of branching in polyacrylates by size-exclusion chromotography (SEC) and melt-state 13C NMR Spectroscopy", Polymer 50 (2009) 2373-2383.
Filip, Xenia, et al., "Heteronuclear Decoupling Under Fast Mas by a Rotor-Synchronized Hahn-Echo Pulse Train", Journal of Magnetic Rosonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.
Klimke, Katja, et al., "Optimisation and Application of Polyolefin Branch Quantification By Melt-State 13CNMR Spectroscopy", Macromol. Chem. Phys. 2006, 207, p. 382-395.
Parkinson, Matthew, et al., "Effect of Branch Length on 13C NMR Relation Properties in Molten Poly[ethylene-co-(alpha olefin)] Model Systems", Macromol. Chem, Phys. 2007, 208-2128-2133.
Pollard, M. Pollard, et al., "Observation of Chain Branching in Polyethylene in the Solid State and Melt via 13C NMR Spectroscopy and Melt NMR Relation Time Measurements", Macromolecules 2004, 37, 813-825.
Randall, James c., "A Review of High Resolution Liquid 13carbon Nuclear Magnetic Resonance Characterizations of Ethylene-Based Polymers", Journal of macromolecular science, C29():201 1989.
Hans Zweifel, Plastic Additives Handbook, 6th edition, 2009, pp. 1141-1190.
Liu, W., Rinaldi, P., Mcintosh, L., Quirk, P., Macromolecules 2001, 34, 4757.

(Continued)

Primary Examiner — Robert C Boyle
(74) Attorney, Agent, or Firm — TAROLLI, SUNDHEIM, COVELL & TUMMINO L.L.P.

(57) ABSTRACT

Articles comprising a polymer composition, wherein the polymer composition is obtainable by grafting an ethylene copolymer with comonomer units comprising hydrolysable silane groups, wherein the polymer composition shows high gel content and low compression set at −25° C. These articles have applications in automotive weather-stripping, such as sealing systems for doors, trunks and hoods.

15 Claims, 2 Drawing Sheets

(56) References Cited

OTHER PUBLICATIONS

Qiu, X., Redwine, D., Gobbi, G., Nuamthanom, A., Rinaldi, P., Macromolecules 2007, 40, 6879.
Yiyong He, et al.; "Unexpected proton spin-lattice relaxation in the solutions of polyolefin and tetrachloroethane"; Research Article, Magnetic Resonance in Chemistry, May 17, 2010; 6 pgs. (www.interscience.com) DOI10.1002/mrc.2617).
A.J. Brandolini, D.D. Hills, "NMR spectra of polymers and polymer additives", Marcel Deker Inc., 2000.
NMR Spectroscopy of Polymers: Innovative Strategies for Complex Macromolecules, Chapter 24, 401 (2011).
Third Party Observation for application No. EP20190779000 dated Aug. 10, 2023.
ISO 815-2, Rubber, Vulcanized or thermoplastic—determination of compression set, 1st edition Feb. 1, 2008.
ISO 815-1, Rubber, Vulcanized or thermoplastic—determination of compression set, 3rd edition Nov. 2019.
Application No. 19779000.9, Communication pursuant to Rule 114-2 EPC, dated Aug. 17, 2023.

\* cited by examiner

CROSS-LINKED PLASTOMERS AS A REPLACEMENT FOR RUBBER

FIELD OF INVENTION

The present invention relates to an article comprising a polymer composition with excellent compression set, particularly at low temperatures. The present invention is also related to a process for production of said article and to the use of a polymer composition comprising said ethylene copolymer for reducing the permanent deformation of said article.

BACKGROUND

Soft, cross-linked polyolefins can be used as a replacement for rubber in many applications. To control cross-linking of polyolefins they can be grafted with silanes followed by cross-linking using a silanol condensation catalyst (SCC).

To make elastic materials the starting polyolefin, i.e. an ethylene copolymer according to the present invention, should have low density and low crystallinity or optimally be fully amorphous. The density of ethylene copolymers is normally reduced by increasing the amount of comonomer. Comonomers having a chain length of greater than 6 carbon atoms (e.g. longer chain length comonomers) prevent the crystallisation of the main chain. Synthesis of low crystallinity copolymers is optionally carried out using single site catalysts, which incorporate monomers randomly leading to a homogenous polymer structure.

Ethylene copolymers are usually then grafted with for example VTMS in a reactive extrusion process using peroxide. Peroxides randomly abstract a hydrogen from the polymer chain allowing VTMS to react with the polymer. In a grafting reaction, the VTMS reacts randomly at various sites in the polymer chain.

EP0756607 B1 relates to moulded articles of silane-crosslinked blends comprising a polyolefin elastomer and a crystalline polyolefin polymer. In particular, this document relates to ethylene polymers (typically copolymers) with densities of greater than 850 kg/m$^3$. These materials exhibit desirable tensile strength and/or compression set properties, as well as good elastic and shrink properties. This document describes ethylene polymers prepared by (i) blending a low density polyolefin elastomer with a crystalline polyolefin polymer, (ii) grafting the blend with a silane crosslinker (such as VTMS) (iii) shaping the silane-grafted blend into the moulded article and (iv) curing the shaped, silane-grafted blend with water, preferably in the presence of a condensation catalyst, e.g. a silanol condensation catalyst. This document particularly focuses on the production of articles, which can be used as cable sheaths; additionally, this document describes that the materials produced as a result of the process described above may be used as flexible weather strips, as fibres, as shoe soles, as gaskets and the like. Moreover, the silane-grafted ethylene polymers produced from the process described above can be shaped into automotive weather protection; this is useful as a sealing system for doors, trunks, and hoods and similar, particularly as the material is clear/transparent.

EP0944670 B1 relates to cross-linkable polymer compositions, and particularly to such compositions wherein cross-linking occurs through a vinyl silane moiety. This document particularly relates to polymer compositions that include both an elastomer and a crystalline polymer, such as a polypropylene homopolymer or a polypropylene/alpha-olefin copolymer. This invention more particularly relates to polymer compositions wherein the elastomer components have a hardness (Shore A) of 85 or less. Moreover, this document describes polymer-based articles for use in footwear and heels, which require an abrasion resistance of preferably greater than 50% in comparison to ungrafted polymers. The polymers described in this document are produced from a solution polymerization process carried out between 20 and 250° C. using a constrained geometry catalyst. They are preferably grafted in the presence of a free radical initiator.

Although, there is significant interest in developing compositions with low compression set vales for a range of articles and applications and in addition, particular interest in developing materials with low compression set values at low temperatures. Generally, in order to improve the compression set of ethylene copolymer based articles a higher percentage of alpha-olefin comonomer units having from 6-12 carbon atoms is added prior to polymerization. However, low density plastomers (such as ethylene copolymers), having a high percentage of comonomer units having from 6-12 carbon atoms are sticky, which makes pelletisation and material handling difficult. Furthermore, removing the unreacted comonomer takes time and energy. Comonomers like 1-octene, are also more expensive than ethylene. It is therefore, economically advantageous to have as little $C_6$-$C_{12}$ alpha olefin comonomer as possible in the ethylene copolymer based articles to create an amorphous structure.

Surprisingly, the inventors found that the above problems can be solved by the use of a polymer composition comprising a specific ethylene copolymer, which requires less comonomer to deliver exemplary compression set values at −25° C.

Additionally, said polymer composition demonstrates a range of other favourable properties such as high toughness, very low levels of extractables and exceptional compatibility with other polymers and elastomers.

SUMMARY OF THE INVENTION

Accordingly, the present invention relates to an article comprising:
  a polymer composition,
    wherein the polymer composition is obtainable by grafting an ethylene copolymer with comonomer units comprising hydrolysable silane groups, and
    wherein, the polymer composition has an amount of more than 0.5 wt. % of the comonomer units comprising hydrolysable silane groups, based on the total weight amount of monomer units in the polymer composition,
    wherein the said ethylene copolymer comprises alpha-olefin comonomer units having from 6-12 carbon atoms, and
    wherein the said ethylene copolymer is characterized as having:
      a density of from 840 to 890 kg/m$^3$,
      a total unsaturation of from 20 to 100 unsaturated bonds per 100,000 $CH_n$ groups.

It has surprisingly been found, that such an article comprising said polymer composition has an extremely low compression set at low temperature, such as −25° C.

In a further aspect, the present invention relates to an article consisting of a:
a polymer composition,
wherein the polymer composition is obtainable by grafting an ethylene copolymer with comonomer units comprising hydrolysable silane groups, and
wherein, the polymer composition has an amount of more than 0.5 wt. % of the comonomer units comprising hydrolysable silane groups, based on the total weight amount of monomer units in the polymer composition,
wherein the said ethylene copolymer comprises alpha-olefin comonomer units having from 6-12 carbon atoms,
and
wherein the said ethylene copolymer is characterized as having:
a density of from 840 to 890 kg/m$^3$,
a total unsaturation of from 20 to 100 unsaturated bonds per 100,000 CH$_n$ groups.

In a still further aspect, the present invention relates to a process for the production of an article comprising the steps of:
a) providing an ethylene copolymer,
wherein the ethylene copolymer comprises alpha-olefin comonomer units having from 6-12 carbon atoms,
wherein the ethylene copolymer is characterized as having:
a density of from 840 to 890 kg/m$^3$,
a total unsaturation of from 20 to 100 unsaturated bonds per 100,000 CH$_n$ groups,
b) obtaining a polymer composition by grafting comonomer units comprising hydrolysable silane groups into the ethylene copolymer with a grafting agent such as VTMS, to obtain a polymer composition with from 0.5 wt. % to 10 wt. % comonomer units comprising hydrolysable silane groups,
c) blending the silane grafted polymer composition from step b) with a silanol condensation catalyst,
d) forming the composition from step c) into an article.

Additionally, the present invention relates to an article obtainable by said process described above.

In a further aspect, the present invention relates to the use of a polymer composition: wherein the polymer composition is obtainable by grafting an ethylene copolymer with comonomer units comprising hydrolysable silane groups, and
wherein, the polymer composition has an amount of more than 0.5 wt. % of the comonomer units comprising hydrolysable silane groups, based on the total weight amount of monomer units in the polymer composition,
wherein the said ethylene copolymer comprises alpha-olefin comonomer units having from 6-12 carbon atoms,
and
wherein the said ethylene copolymer is characterized as having:
a density of from 840 to 890 kg/m$^3$,
a total unsaturation of from 20 to 100 unsaturated bonds per 100,000 CH$_n$ groups,
for reducing the permanent deformation (compression set measured according to ISO 815-1:2010-9) of a cross-linked article in comparison to a cross-linked article obtainable from an ethylene copolymer with lower total unsaturation.

Definitions

Where an indefinite or definite article is used when referring to a singular noun, e.g. "a", "an" or "the", this includes a plural of that noun unless something else is specifically stated.

A copolymer is a polymer formed by the reaction of two or more different monomers, leading to monomer units of more than one kind.

A plastomer is a polymer, which combines the qualities of elastomers and plastics, such as rubber-like properties with the processing abilities of plastic.

An ethylene-based plastomer, is a plastomer with a molar majority of ethylene monomer units. A vinyl group is used to refer to an unsaturated group at the end of a hydrocarbon polymer chain. Vinyl groups are defined by the formula R—CH=CH$_2$.

Flashing, is used to refer to lowering the pressure in a reaction vessel in order to cause the liquid component to evaporate, often leaving behind a solid product. Due to the reduced pressure the evaporation occurs quickly and the liquid "flashes" into vapour.

VTMS refers to vinyltrimethoxysilane, used as a silane grafting agent.

Crosslinking refers to the optional crosslinking of polymer chains via the comonomer units comprising hydrolysable silane groups, which are present in the polymer composition. The optional crosslinking is usually carried out in the presence of a silanol condensation catalyst. Accordingly, during the optional crosslinking step, the units comprising hydrolysable silane groups present in the polymer composition are hydrolysed under the influence of water in the presence of the silanol condensation catalyst. This hydrolysis step results in the loss of alcohol groups and the formation of silanol groups, which are then crosslinked in a subsequent condensation reaction, wherein water is lost and Si—O—Si links are formed between other hydrolysed silane groups present in the said polymer composition. Silane crosslinking techniques are known and described e.g. in U.S. Pat. Nos. 4,413,066, 4,297,310, 4,351,876, 4,397,981, 4,446,283 and 4,456,704. The crosslinked polymer composition has a typical network, i.e. interpolymer crosslinks (bridges), as well known in the field.

In the following, amounts are given as % by weight (wt. %) unless it is stated otherwise.

In the following, the individual embodiments of the present invention are defined in more detail.

Ethylene Copolymer

The ethylene copolymer refers to the raw ethylene copolymer, which is admixed to form the polymer composition, i.e. the raw ethylene copolymer prior to the polymer composition being grafted with comonomer units comprising hydrolysable silane groups as described in more detail below.

The ethylene copolymer comprises alpha-olefin comonomer units having from 6-12 carbon atoms. Suitably, the ethylene copolymer comprises from 10 wt. % to 50 wt. % of alpha olefin comonomer units having from 6 to 12 carbon atoms, preferably from 20 wt. % to 45 wt. % of alpha olefin comonomer units having from 6 to 12 carbon atoms, and most preferably from 30 wt. % to 40 wt. % of alpha olefin comonomer units having from 6 to 12 carbon atoms. The alpha olefin comonomer units are preferably linear alpha olefin comonomer units.

The alpha olefin comonomer units are preferably selected from 1-octene and/or 1-hexene, most preferably the alpha olefin comonomer units are 1-octene. Preferably, copolymers of ethylene and 1-octene are used in the articles of the present invention. In certain further embodiments, the ethylene copolymer has a 1-octene content of from 10 to 60 wt. %, preferably from 10 to 50 wt. %, more preferably from 20 to 40 wt. %, or from 20 to 38 wt. %. The 1-octene content can be measured by using NMR to determine the ratio of $C_8$ monomers in the polymer chain.

The ethylene copolymer has a density in the range of from 840 to 890 kg/m$^3$, preferably from 850 to 880 kg/m$^3$, most preferably from 860 to 870 kg/m$^3$.

Preferably, the ethylene copolymer has a crystallinity of between 2 and 9%, more preferably between 5 and 8%, such as between 6.5 and 7.5%, such as around 7% measured according to the method described below.

The ethylene copolymer has a total unsaturation level of from 20 to 100 unsaturated bonds per 100,000 $CH_n$ groups, preferably from 30 to 80 unsaturated bonds per 100,000 $CH_n$ groups, more preferably from 40 to 60 unsaturated bonds per 100,000 $CH_n$ groups. Without wishing to be bound by any theory, it is believed that a higher degree of unsaturation leads to better resistance to deformation of the polymer at low temperatures.

Preferably, the ethylene copolymer prior to being grafted with a comonomer comprising hydrolysable silane groups has a ratio of vinyl groups to total amount of unsaturated groups in the ethylene copolymer of less than 0.6 and more preferably from 0.3 to 0.1. The ratio of vinyl groups to total amount of unsaturated groups in the ethylene copolymer can be calculated using equation (I):

$$\text{Ratio of vinyl groups} = \frac{[\text{vinyl}]}{[\text{vinyl}] + [\text{vinylidene}] + [cis] + [trans] + [tris]} \quad (I)$$

It is preferred that, the ratio of cis to trans groups in the ethylene copolymer is greater than 1 and more preferably greater than 2.

Further, the ethylene copolymer preferably has a Tg of from —40° C. to —80° C., more preferably from —50° C. to —70° C.

The ethylene copolymer may have an MFR$_2$ (ISO 1133; 190° C.; 2.16 kg) in the range of from 0.01 to 5.0 g/10 min, preferably in the range of from 0.25 to 1.25 g/10 min, more preferably in the range of from 0.25 to 1.20 g/10 min.

Suitable ethylene copolymers can be any copolymer of ethylene and an alpha olefin having from 6 to 12 carbon atoms, said alpha olefin having the above defined properties. Preferably, the ethylene copolymer is selected from ethylene based plastomers. Suitable ethylene based plastomers are commercially available, i.e. from Borealis under the tradename Queo.

In certain such embodiments, the ethylene copolymer may have been produced in a solution polymerization process, comprising the steps of:
a) providing ethylene monomer units,
b) providing alpha olefin co-monomer units having from 6-12 carbon atoms,
c) providing a liquid hydrocarbon solvent,
d) providing a metallocene catalyst,
e) heating the reaction vessel to above the melting point of the ethylene copolymer to allow the polymerization process to be carried out, thereby obtaining the ethylene copolymer in solution,
f) flashing the solution in order to separate the polymer from the unreacted monomer and the solvent,
g) obtaining the ethylene copolymer.

The alpha olefin co-monomer units in step b) are preferably 1-octene. Preferably, the 1-octene content is from 10 wt. % to 45 wt. % of the total ethylene copolymer obtained in step g.

Alternatively, these ethylene based plastomers can be prepared by known processes, such as one stage or two stage polymerization processes, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably, these ethylene-based plastomers are prepared by a one stage or two-stage solution polymerization process, especially by a high temperature solution polymerization process at temperatures higher than 100° C., in the presence of a metallocene catalyst.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. Preferably, the polymerization temperature is at least 110° C., more preferably at least 150° C. The polymerization temperature can be up to 250° C.

The pressure in such a solution polymerization process is preferably in the range of 10 to 100 bar, preferably 15 to 100 bar and more preferably 20 to 100 bar.

The liquid hydrocarbon solvent used is preferably a hydrocarbon having from 5 to 12 carbon atoms, which may be unsubstituted or substituted by alkyl groups having from 1 to 4 carbon atoms such as pentane, methyl pentane, hexane, heptane, octane, cyclohexane, methyl cyclohexane and hydrogenated naphtha. More preferably, unsubstituted hydrocarbon solvents having from 6 to 10 carbon atoms are used.

Polymer Composition

The polymer composition is obtainable by grafting the ethylene copolymer with comonomer units comprising hydrolysable silane groups. The amount of comonomer units comprising hydrolysable silane groups in the polymer composition is more than 0.5 wt. %, preferably, the amount of comonomer units comprising hydrolysable silane groups is at least 0.75 wt. %, more preferably at least 1.5 wt. % based on the total weight amount of monomer units in the ethylene copolymer. Usually, the amount of comonomer units comprising hydrolysable silane groups is not higher than 10 wt. %, preferably not higher than 7.5 wt. %, more preferably not higher than 5.0 wt. %, most preferably not higher than 3.5 wt. %, based on the total weight amount of monomer units in the polymer composition. Most preferably, the polymer composition comprises from 1.5 wt. % to 3.5 wt. % of comonomer units comprising hydrolysable silane groups, based on the total amount of monomer units in the ethylene polymer.

The polymer composition may also contain additional comonomer units comprising hydrolysable silane groups.

The comonomer units comprising hydrolysable silane groups are hydrolysable silane group(s) containing comonomer units, which are used for copolymerizing silane group (s) containing units. The comonomer units are preferably an unsaturated silane compound or, preferably, comonomer units of formula (II)

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y, which may be the same or different, is a hydrolysable organic group and q is 0, 1 or 2.

Special examples of the unsaturated silane compounds are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl or arylamino group; and $R^2$, if present, is a methyl, ethyl, propyl, decyl or phenyl group.

Further suitable silane compounds or, preferably comonomers are e.g. gamma-(meth)acryloxypropyl trimethoxysilane, gamma-(meth)acryloxypropyl triethoxysilane, and vinyl triacetoxysilane, or combinations of two or more thereof.

As a preferable subgroup unit of formula (II) is an unsaturated silane compound or, preferably, comonomer of formula (III)

wherein each A is independently a hydrocarbyl group having 1-8 carbon atoms, preferably 1-4 carbon atoms.

Preferred comonomers/compounds of the formula (III) are vinyl trimethoxysilane, vinyl bismethoxyethoxysilane, vinyl triethoxysilane, vinyl trimethoxysilane being the most preferred.

In certain embodiments, the ethylene copolymer after being grafted with the comonomer units comprising hydrolysable silane groups has a density in the range of from 840 to 890 kg/m³, preferably from 850 to 880 kg/m³, most preferably from 860 to 870 kg/m³.

The polymer composition can further comprise one or more additives in a total amount of from 0.0 up to 5.0 wt. %, based on the total weight amount of the composition, selected from the group comprising slip agents, anti-block agents, UV stabilizers, acid scavengers, antioxidants, alpha- and/or beta-nucleating agents, antistatic agents etc. and mixtures thereof. Such additives are commonly known in the art.

Slip agents migrate to the surface and act as lubricants polymer to polymer and polymer against metal rollers, giving reduced coefficient of friction (CoF) as a result. Examples are fatty acid amides, like erucamides (CAS No. 112-84-5), oleamides (CAS No. 301-02-0) or stearamide (CAS No. 124-26-5).

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1); Common antiblocking agents are natural silica such as diatomaceous earth (such as CAS No. 60676-86-0 (SuperfFloss™), CAS-No. 60676-86-0 (Super-Floss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminium silicate CAS-No. 1344-00-9, calcined kaolin CAS-No. 92704-41-1, aluminium silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0). Suitable UV-stabilisers are, for example, Bis-(2,2,6,6-tetramethyl-4-piperidyl)-sebacate (CAS-No. 52829-07-9, Tinuvin 770); 2-hydroxy-4-n-octoxy-benzophenone (CAS-No. 1843-05-6, Chimassorb 81).

Alpha nucleating agents may be sodium benzoate (CAS No. 532-32-1); 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-2.000 ppm for each individual component of the polymer.

The optional additives are preferably added either during the polymerization process of the ethylene copolymer, or during the subsequent grafting of the ethylene copolymer with comonomer units comprising hydrolysable silane groups, or during the blending of the polymer composition with a silanol condensation catalyst.

The optional additives can be added to the ethylene copolymer in the form of master batches in which one or more additives are blended with carrier polymer in concentrated amounts. Any optional carrier polymer is calculated as being within the total amount of additives, based on the amount of the total polyethylene composition.

The polymer composition of the invention may also comprise fillers, which are different from said additives, depending on the article. Typically, the amounts of fillers are higher than the amounts of the additives as defined above. As non-limiting examples of fillers flame retardants (FRs), carbon black and titanium oxide can be mentioned. As examples of flame retardants as said fillers, e.g. magnesium hydroxide and ammonium polyphosphate can be mentioned. Preferably, the optional filler is selected from one or two of the group of magnesium hydroxide, ammonium polyphosphate, titanium oxide and carbon black. The amount of the filler in general depends on the nature of the filler and the desired end application, as evident for a skilled person. Such fillers are generally commercially available and are described, for example, in "Plastic Additives Handbook", 5th edition, 2001 of Hans Zweifel. Moreover, the above additives and fillers are excluded from the definition of a silanol condensation catalyst (SCC).

The polymer composition preferably comprises the ethylene copolymer in an amount of from 30 wt. % to 99.9 wt. %, more preferably from 40 wt. % to 99.0 wt. %, still more preferably from 50 wt. % to 98.5 wt. %, based on the total weight of the composition.

In one embodiment, the ethylene copolymer is the only polymeric component of the polymer composition. In said embodiment, the ethylene copolymer is preferably present in an amount of from 94 wt. % to 99.9 wt. %, more preferably from 95 wt. % to 99.5 wt. %, and most preferably of from 96 wt. % to 98.5 wt. % of the polymer composition, based on the total weight of the composition.

In another embodiment, the polymer composition can comprise further polymer components. These polymer components are preferably selected from ethylene homo- or copolymers, such as LDPE, LLDPE, UHDPE or HDPE, and propylene homo- or co-polymers, such as propylene homopolymers, propylene random copolymers or heterophasic propylene copolymers. These further polymer components may be added to the polymer composition prior to, during, or after the grafting step.

The additional polymeric components can be present in the polymer composition in an amount of from 30 wt. % to 80 wt. %, preferably from 40 wt. % to 75 wt. % and most preferably from 50 wt. % to 70 wt. %, based on the total amount of the polymer composition.

In said embodiment, the ethylene copolymer is preferably present in an amount of from 20 to 70 wt. %, preferably from 25 to 60 wt. % and most preferably from 30 to 50 wt. %, based on the total weight of the composition.

The melting points (measured according to the method described below) of polymer compositions according to the present invention are optionally below 130° C., preferably below 120° C., more preferably below 110° C. and most preferably below 100° C.

Article

The present invention is directed to articles comprising the polymer composition of the present invention, as defined above or below. The polymer composition preferably has been cross-linked after forming an article by hydrolysing the silane groups in the presence of a silanol condensation catalyst.

The silanol condensation catalyst (SCC), if present, is preferably selected from the group of carboxylates of metals, such as tin, zinc, iron, lead and cobalt; titanium compounds bearing a group hydrolysable to a Brönsted acid (preferably as described in the EP Application, no. EP10166636.0) or aromatic organic acids, such as aromatic organic sulphonic acids. The silanol condensation catalyst, if present, is more preferably selected from DBTL (dibutyl tin dilaurate), DOTL (dioctyl tin dilaurate), particularly DOTL; titanium compounds bearing a group hydrolysable to a Brönsted acid as defined above; or an aromatic organic sulphonic acid which has a well known meaning in the art.

Preferably, the silanol condensation catalyst may be a sulphonic acid, preferably an aromatic organic sulphonic acid, which is an organic sulphonic acid which comprises the structural element according to formula (IV):

$$\text{Ar}(\text{SO}_3\text{H})_x \qquad \text{(IV)}$$

wherein, Ar is an aryl group which may be substituted or non-substituted, and if substituted, then suitably with at least one hydrocarbyl group comprising up to 50 carbon atoms, and wherein x is at least 1;

or, wherein said structural element is a precursor of the sulphonic acid of formula (IV) including an acid anhydride thereof or a sulphonic acid of formula (IV) that has been provided with hydrolysable protective groups, e.g. an acetyl group that is removable by hydrolysis.

The silanol condensation catalyst is preferably present in the polymer composition in an amount of from 0.0001 wt. % to 1.0 wt. %, more preferably of from 0.01 wt. % to 0.75 wt. %, most preferably of from 0.1 wt. % to 0.5 wt. %, based on the total weight of the polymer composition.

The cross-linking degree of the polymer composition after cross-linking is preferably in the range of from 75% to 99%, more preferably from 90% to 99%.

Compression set is a measure of how much a material permanently deforms after application of pressure for a predefined period of time; it therefore, is a useful indication of how resistant a material is to permanent deformation under a particular set of conditions. Without wishing to be bound by any theory, it is believed that a high Si-grafting degree, preferably greater than 90% cross-linking degree is desirable for good elasticity of the polymer composition and, which leads to low compression set values at low temperatures. This is also reflected in the gel content of the composition, which increases when increasing the amount of comonomer comprising hydrolysable silane groups.

Preferably, the article after crosslinking has a compression set of from 0% to 5% when measured at −25° C., preferably of from 0% to 4%, more preferably from 0% to 3%. Without wishing to be bound by any theory, it is believed that the very low, almost negligible crystallinity (in the range of 6-7%) of the ethylene copolymers according to the present invention (such as e.g. Queo from Borealis) makes the articles produced from said ethylene copolymers very elastic even at low temperatures, where all chains which are able to crystallise will crystallise. In addition, without wishing to be bound by any theory it is believed that the high unsaturation level of the ethylene copolymers according to the present invention contributes to the surprising low compression set values obtained here at low temperatures.

The article, after cross-linking preferably has a compression set of from 0% to 20%, preferably from 0% to 15%, most preferably from 0% to 12.5%, when measured at 23° C. It is generally preferable for articles to have a low compression set at elevated temperatures such as 23° C., or 30° C., or 50° C., or 70° C. or 90° C., as well as a low compression set at low temperatures such as −25° C., or −10° C., or −5° C.

The article is preferably formed by extrusion, injection moulding, blow moulding or compression moulding, most preferably the article is an extruded article.

A non-exclusive list of uses for articles according to the present invention includes weather seals, automobile components, such as sealing systems for doors, trunks and hoods, shoe soles and other articles where it is necessary to have low deformation at low temperatures.

In certain embodiments, the current invention relates to the use of a polymer composition:
  wherein the polymer composition is obtainable by grafting an ethylene copolymer with
  comonomer units containing hydrolysable silane groups, and
  wherein, the polymer composition has an amount of more than 0.5 wt. % of the comonomer units comprising hydrolysable silane groups, based on the total weight amount of monomer units in the polymer composition,
    wherein the said ethylene copolymer comprises alpha-olefin comonomer units having from 6-12 carbon atoms,
    and
    wherein the said ethylene copolymer is characterized as having:
      a density of from 840 to 890 kg/m³,
      a total unsaturation of from 20 to 100 unsaturated bonds per 100,000 $CH_n$ groups,
  for reducing the permanent deformation (compression set measured according to ISO 815-1:2010-9) of a cross-linked article in comparison to a cross-linked article obtainable from an ethylene copolymer with lower total unsaturation.

In certain such embodiments, the current invention relates to the use of a polymer composition:
- wherein the polymer composition is obtainable by grafting an ethylene copolymer with comonomer units containing hydrolysable silane groups, and
- wherein, the polymer composition has an amount of more than 0.5 wt. % of the comonomer units comprising hydrolysable silane groups, based on the total weight amount of monomer units in the polymer composition, and,
- wherein, the polymer composition comprises at least 90% of the ethylene copolymer, wherein the said ethylene copolymer comprises alpha-olefin comonomer units having from 6-12 carbon atoms, and
- wherein the said ethylene copolymer is characterized as having:
  - a density of from 840 to 890 kg/m$^3$,
  - a total unsaturation of from 20 to 100 unsaturated bonds per 100,000 $CH_n$ groups, for reducing the permanent deformation (compression set measured according to ISO 815-1:2010-9) of a cross-linked article in comparison to a cross-linked article containing an ethylene copolymer with lower total unsaturation.

Process

The present invention also relates to a process for the production of an article comprising the steps of:
a) providing an ethylene copolymer,
  - wherein the ethylene copolymer comprises alpha-olefin comonomer units having from 6-12 carbon atoms,
  - wherein the ethylene copolymer is characterized as having:
    - a density of from 840 to 890 kg/m$^3$,
    - a total unsaturation of from 20 to 100 unsaturated bonds per 100,000 $CH_n$ groups,
b) obtaining a polymer composition by grafting comonomer units comprising hydrolysable silane groups into the ethylene copolymer with a grafting agent such as VTMS, to obtain a polymer composition with from 0.5 wt. % to 10 wt. % comonomer units comprising hydrolysable silane groups,
c) blending the silane grafted polymer composition from step b) with a silanol condensation catalyst,
d) forming the composition from step c) into an article.

Preferably, the article is cross-linked in the presence of water to obtain a gel content of 75% to 99%, preferably from 90% to 99%. The cross-linking step may be carried out at room temperature (25° C.), or at elevated temperatures such as 40° C., or 50° C., or more than 60° C.

The article may be formed in step (d) by extrusion, injection moulding, blow moulding or compression moulding.

In a preferred aspect, the process according to the present invention comprises using a silanol catalyst in step (c), wherein the silanol condensation catalyst may be a sulphonic acid, preferably wherein the silanol condensation catalyst is an aromatic organic sulphonic acid, which is an organic sulphonic acid and which comprises the structural element:

$$Ar(SO_3H)_x \qquad (IV)$$

wherein, Ar is an aryl group which may be substituted or non-substituted, and if substituted, then suitably with at least one hydrocarbyl group comprising up to 50 carbon atoms, and wherein x is at least 1;
or wherein the structural element is a precursor of the sulphonic acid of formula (IV) including an acid anhydride thereof or a sulphonic acid of formula (IV) that has been provided with a hydrolysable protective groups, e.g. an acetyl group that is removable by hydrolysis.

The current invention also relates to an article obtainable by the process described above.

DETAILED DESCRIPTION

In a first particularly preferred embodiment, the present invention relates to an article comprising:
a polymer composition,
  - wherein the polymer composition is obtainable by grafting an ethylene copolymer with comonomer units comprising hydrolysable silane groups, and
  - wherein, the polymer composition has an amount of more than 0.5 wt. % of the comonomer units comprising hydrolysable silane groups, based on the total weight amount of monomer units in the polymer composition,
  - wherein the said ethylene copolymer comprises 1-octene units, and
  - wherein the said ethylene copolymer is characterized as having:
    - a density of from 840 to 890 kg/m$^3$,
    - a total unsaturation of from 20 to 100 unsaturated bonds per 100,000 $CH_n$ groups, and
  - wherein the ethylene copolymer comprises from 30 wt. % to 40 wt. % of 1-octene units, based on the total amount of monomer units in the ethylene copolymer (as determined using NMR), and
  - wherein after crosslinking the article has a compression set (ISO 815-1:2010-9 at −25° C.) of from 0% to 5% when measured at −25° C.

In a second preferred embodiment, the present invention relates to an article comprising:
a polymer composition,
  - wherein the polymer composition is obtainable by grafting an ethylene copolymer with comonomer units comprising hydrolysable silane groups, and
  - wherein, the polymer composition has an amount of more than 0.5 wt. % of the comonomer units comprising hydrolysable silane groups, based on the total weight amount of monomer units in the polymer composition,
  - wherein the said ethylene copolymer comprises 1-octene units, and
  - wherein the said ethylene copolymer is characterized as having:
    - a density of from 840 to 890 kg/m$^3$,
    - a total unsaturation of from 20 to 100 unsaturated bonds per 100,000 $CH_n$ groups, and
  - wherein the ethylene copolymer comprises from 30 wt. % to 40 wt. % of 1-octene units, based on the total amount of monomer units in the ethylene copolymer (as determined using NMR), and
  - wherein the ratio of vinyl groups to total unsaturated groups in the ethylene copolymer is from 0.3 to 0.1.

In a third preferred embodiment, the present invention relates to an article comprising:
a polymer composition,
wherein the polymer composition is obtainable by grafting an ethylene copolymer with comonomer units comprising hydrolysable silane groups,
and
wherein, the polymer composition has an amount of more than 0.5 wt. % of the comonomer units comprising hydrolysable silane groups, based on the total weight amount of monomer units in the polymer composition,
wherein the said ethylene copolymer comprises 1-octene units,
and
wherein the said ethylene copolymer is characterized as having:
a density of from 840 to 890 kg/m$^3$,
a total unsaturation of from 20 to 100 unsaturated bonds per 100,000 $CH_n$ groups, and
wherein the ethylene copolymer comprises from 30 wt. % to 40 wt. % of 1-octene units, based on the total amount of monomer units in the ethylene copolymer (as determined using NMR), and
wherein the ratio of cis to trans groups in the ethylene copolymer is greater than 2.

In a fourth preferred embodiment, the present invention relates to an article comprising: a polymer composition,
wherein the polymer composition is obtainable by grafting an ethylene copolymer with comonomer units comprising hydrolysable silane groups,
and
wherein, the polymer composition has an amount of more than 0.5 wt. % of the comonomer units comprising hydrolysable silane groups, based on the total weight amount of monomer units in the polymer composition,
wherein the said ethylene copolymer comprises alpha-olefin comonomer units having from 6-12 carbon atoms,
and
wherein the said ethylene copolymer is characterized as having:
a density of from 840 to 890 kg/m$^3$,
a total unsaturation of from 20 to 100 unsaturated bonds per 100,000 $CH_n$ groups,
a crystallinity between 5 and 8% when measured by DSC using 10° C./min cooling and heating rates, and
wherein the ethylene copolymer comprises from 30 wt. % to 40 wt. % of 1-octene units, based on the total amount of monomer units in the ethylene copolymer (as determined using NMR), and
wherein after crosslinking the article has a compression set (ISO 815-1:2010-9 at −25° C.) of from 0% to 5% when measured at −25° C.

The above mentioned embodiments may be combined with any preferred feature as described herein as far as appropriate.

EXAMPLE SECTION

The following Examples are included to demonstrate certain aspects and embodiments of the invention as described in the claims. It should be appreciated by those of skill in the art, however, that the following description is illustrative only and should not be taken in any way as a restriction of the invention.

Determination Methods a) Melt flow rate: The melt flow rate $MFR_2$ was measured in accordance with ISO 1133 at 190° C. and a load of 2.16 kg for ethylene homo and copolymers.

b) Density is measured according to ISO 1183-187. Sample preparation is done by compression moulding in accordance with ISO 1872-2:2007.

c) Quantitative nuclear-magnetic resonance (NMR) spectroscopy:

The content (wt. % and mol %) of polar comonomer present in the polymer:

Quantitative nuclear-magnetic resonance (NMR) spectroscopy was used to quantify the comonomer content of the polymer in the polymer composition.

Quantitative $^1$H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-$d_2$ (TCE-$d_2$) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32 k data points were collected per FID with a dwell time of 60 µs, which corresponded to a spectral window of approx. 20 ppm. The FID was then zero filled to 64 k data points and an exponential window function applied with 0.3 Hz line-broadening. This setup was chosen primarily for the ability to resolve the quantitative signals resulting from vinyltrimethylsiloxane copolymerization when present in the same polymer.

Quantitative $^1$H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butylacrylate (BA) and vinyltrimethylsiloxane (VTMS), in various comonomer sequences, were observed (see J Randall). All comonomer contents calculated with respect to all other monomers present in the polymer.

The ethylene comonomer content was quantified using the integral of the bulk aliphatic (bulk) signal between 0.00-3.00 ppm. This integral may include the 1VA (3) and αVA (2) sites from isolated vinylacetate incorporation, *MA and αMA sites from isolated methylacrylate incorporation, 1 BA (3), 2BA (2), 3BA (2), *BA (1) and αBA (2) sites from isolated butylacrylate incorporation, the *VTMS and αVTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E=(\tfrac{1}{4})*[I_{bulk}-5*VA-3*MA-10*BA-3*VTMS-21*BHT]$$

It should be noted that half of the α signals in the bulk signal represent ethylene and not comonomer and that an insignificant error is introduced due to the inability to compensate for the two saturated chain ends (S) without associated branch sites.

d) Comonomer (C8) Content Quantification of Poly(Ethylene-Co-1-Octene) Copolymers Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe-head at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke01, parkinson02, castignolles03, NMR04} Standard single-pulse excitation was employed utilising the transient NOE at short recycle delays of 3 s {pollard05, klimke01} and the RS-HEPT decoupling scheme.{Filif06, Griffin07} A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm.{Randall08}Characteristic signals corresponding to the incorporation of 1-octene were observed {Randall08, Liu09, Qiu10, Busisco11, Zhou12} and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both *B6 and *βB6B6 sites of isolated (EEOEE) and isolated double non-consecutive (EEOEOEE) 1-octene sequences respectively. To compensate for the influence of the two *βB6B6 sites the integral of the ββB6B6 site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the ααB6B6 sites accounting for the number of reporting sites per comonomer:

$$OO = 2*I_{\alpha\alpha B6B6}$$

Characteristic signals resulting from isolated non-consecutive 1-octene incorporation, i.e.

EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (½)*(I_{2S+2B6} + I_{3S+3B6} - 2*O_{total})$$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$$E_{total} = (½)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total})/(E_{total} + O_{total})$$

The total comonomer incorporation of 1-octene in weight percent was calculated from the mole fraction in the standard manner:

$$O[wt \%] = 100*(fO*112.21)/((fO*112.21) + ((1-fO)*28.05))$$

Klimke01
Klimke, K., Parkinson, M., Piel, C., Kaminsky, W., Spiess, H. W., Wilhelm, M., Macromol. Chem. Phys. 2006; 207:382.
Parkinson02
Parkinson, M., Klimke, K., Spiess, H. W., Wilhelm, M., Macromol. Chem. Phys. 2007; 208:2128. Castignolles03
Castignolles, P., Graf, R., Parkinson, M., Wilhelm, M., Gaborieau, M., Polymer 50 (2009) 2373
NMR04
NMR Spectroscopy of Polymers: Innovative Strategies for Complex Macromolecules, Chapter 24, 401 (2011)
Pollard05
Pollard, M., Klimke, K., Graf, R., Spiess, H. W., Wilhelm, M., Sperber, O., Piel, C., Kaminsky, W., Macromolecules 2004; 37:813.

Filip06
Filip, X., Tripon, C., Filip, C., J. Mag. Resn. 2005, 176, 239
Grifin07
Griffin, J. M., Tripon, C., Samoson, A., Filip, C., and Brown, S. P., Mag. Res. in Chem. 2007 45, S1, S198
Randall08
J. Randall, Macromol. Sci., Rev. Macromol. Chem. Phys. 1989, C29, 201.
Liu09
Liu, W., Rinaldi, P., McIntosh, L., Quirk, P., Macromolecules 2001, 34, 4757
Qiu10
Qiu, X., Redwine, D., Gobbi, G., Nuamthanom, A., Rinaldi, P., Macromolecules 2007, 40, 6879
Busico11
Busico, V., Carbonniere, P., Cipullo, R., Pellecchia, R., Severn, J., Talarico, G., Macromol. Rapid Commun. 2007, 28, 1128
Zhou12
Zhou, Z., Kuemmerle, R., Qiu, X., Redwine, D., Cong, R., Taha, A., Baugh, D. Winniford, B., J. Mag. Reson. 187 (2007) 225 e) Quantitative Nuclear-Magnetic Resonance (NMR) Spectroscopy was Used to Quantify the VTMS Content and Derived Properties of the Polymers.

Quantitative nuclear-magnetic resonance (NMR) spectroscopy was used to quantify the VTMS content of the polymers.

Quantitative $^1$H NMR spectra recorded in the molten-state using a Bruker Avance III 500 NMR spectrometer operating at 500.13 MHz. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed applying short recycle delay of 2 s. A total of 128 transients were acquired per spectrum.

Quantitative $^1$H NMR spectra were processed, integrated and quantitative properties determined using custom spectral analysis automation programs. All chemical shifts are internally referenced to the polyethylene methylene signal at 1.33 ppm.

Characteristic signals resulting from grafting of vinyltrimethylsiloxane, in various comonomer sequences, were observed. The vinyltrimethylsiloxane grafting was quantified using the integral of the signal at 3.52 ppm assigned to the 1VTMS sites {brandolini01}, accounting for the number of reporting nuclei per comonomer:

$$gVTMS = I_{1VTMS}/9$$

The ethylene content (E) was quantified using the integral of the bulk aliphatic (bulk) signal between 0.00-3.00 ppm. This integral must be compensated by subtracting 4 times gVTMS (2 methylene groups, 2VTMS and 3VTMS) and add once gVTMS (*VTMS missing 1 proton) in total subtracting 3 times gVTMS.

$$E = (bulk - 3*gVTMS)/4$$

It should be noted that an insignificant error is introduced due to the inability to compensate for the saturated chain ends without associated branch sites.

The total mole fractions of vinyltrimethylsiloxane in the polymer was calculated as:

$$fVTMS = gVTMS/(E + gVTMS)$$

The total comonomer incorporations of vinyltrimethylsiloxane in weight percent was calculated from the mole fractions in the standard manner:

$$cVTMS[wt\%] = [100*(fVTMS*148.23)]/[(fVTMS*148.23) + ((1 - fVTMS)*28.05)]$$

The quantification of grafted vinyltrimethylsiloxane in weight percent cVTMS [wt %] by $^1$H NMR as described is independent from additional alpha-co-olefins with even numbers of carbons e.g. C4, C6 or C8 which might be incorporated in the polyethylene chain.

brandolini01
A. J. Brandolini, D. D. Hills, "NMR spectra of polymers and polymer additives", Marcel Deker Inc., 2000
klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
castignolles09
Castignolles, P., Graf, R., Parkinson, M., Wilhelm, M., Gaborieau, M., Polymer 50 (2009) 2373

It is evident for a skilled person that the above principle can be adapted similarly to quantify content of any further polar comonomer(s) which is other than MA BA and VA, if within the definition of the polar comonomer as given in the present application, and to quantify content of any further silane group(s) containing units which is other than VTMS, if within the definition of silane group(s) containing units as given in the present application, by using the integral of the respective characteristic signal.

f) Quantitative Nuclear-Magnetic Resonance (NMR) Spectroscopy to Quantify the Content of Unsaturated Groups Present in the Polymer Compositions.

Quantitative $^1$H NMR spectra were recorded in the solution-state using a Bruker Advance III 400 NMR spectrometer operating at 400.15 MHz. All spectra were recorded using a $^{13}$C optimized 10 mm selective excitation probehead at 125° C. using nitrogen gas for all pneumatics. Approximately 250 mg of material was dissolved in 7,2-tetrachloroethane$_{-c/2}$ (TCE$_{-c/2}$) using approximately 3 mg of Hostanox 03 (CAS 32509-66-3) as stabilizer. Standard single-pulse excitation was employed utilizing a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. {he10a, busico05a} All chemical shifts were indirectly referenced to TMS at 0.00 ppm using the signal resulting from the residual protonated solvent at 5.95 ppm.

Characteristic signals corresponding to the presence of terminal aliphatic vinyl groups (R—CH=CH$_2$) were observed and the amount quantified using the integral of the two coupled inequivalent terminal CH$_2$ protons (Va and Vb) at 4.95, 4.98 and 5.00 and 5.05 ppm accounting for the number of reporting sites per functional group:

$N_{vinyl} = IV_{ab}/2$

Characteristic signals corresponding to the presence of internal vinylidene groups (RR(C=CH$_2$)) were observed and the amount quantified using the integral of the two CH$_2$ protons (D) at 4.74 ppm accounting for the number of reporting sites per functional group:

$N_{vinylidene} = ID/2$

When characteristic signals corresponding to the presence of internal cis-vinylene groups (E-RCH=CHR), or related structure, were observed, then the amount quantified using the integral of the two CH protons (C) at 5.39 ppm accounting for the number of reporting sites per functional group:

$N_{cis} = IC/2$

When characteristic signals corresponding to the presence of internal cis-vinylene groups (E-RCH=CHR), or related structure, were not visually observed, then these groups were not counted and the parameter $N_{cis}$ was not used.

Characteristic signals corresponding to the presence of internal trans-vinylene groups (Z—RCH=CHR) were observed and the amount quantified using the integral of the two CH protons (T) at 5.45 ppm accounting for the number of reporting sites per functional group:

$N_{trans} = IT/2$

Characteristic signals corresponding to the presence of internal trisubstituted-vinylene groups (RCH=CRR), or related structure, were observed and the amount quantified using the integral of the CH proton (Tris) at 5.14 ppm accounting for the number of reporting sites per functional group:

$N_{tris} = ITris$

The Hostanox 03 stabliser was quantified using the integral of multiplet from the aromatic protons (A) at 6.92, 6.91, 6.69 and 6.89 ppm and accounting for the number of reporting sites per molecule:

$H = IA/4$

As is typical for unsaturation quantification in polyolefins the amount of unsaturation was determined with respect to total carbon atoms, even though quantified by $^1$H NMR spectroscopy. This allows direct comparison to other microstructure quantities derived directly from $^{13}$C NMR spectroscopy.

The total amount of carbon atoms was calculated from integral of the bulk aliphatic signal between 2.85 and −10.00 ppm with compensation for the methyl signals from the stabiliser and carbon atoms relating to unsaturated functionality not included by this region:

$NC_{total} = (Ibulk - 42'H)/2 + 2*Nvinyl + 2*Nvinylidene + 2*Ncis + 2*Ntrans + 2*Ntris$ The content of unsaturated groups (U) was calculated as the number of unsaturated groups in the polymer per thousand total carbons (kCHn):

$U = 1000*N/NC_{total}$

The total amount of unsaturated group was calculated as the sum of the individual observed unsaturated groups and thus, also reported with respect per thousand total carbons:

$U_{total} = U_{vinyl} + U_{vinylidene} + U_{cis} + U_{trans} + U_{tris}$

The relative content of a specific unsaturated group (U) is reported as the fraction of a given unsaturated group with respect to the total amount of unsaturated groups:

$$[U] = \frac{U_x}{U_{total}}$$

BIBLIOGRAPHIC REFERENCES

J. Randall:
J. Randall et. al. Macromol. Sci., Rev. Macromol. Chem. Phys. 1989, C29, 201. he10a:
He, Y., Qiu, X, and Zhou, Z., Mag. Res. Chem. 2010, 48, 537-542. busico05a:
Busico, V. et. al. Macromolecules, 2005, 38 (16), 6988-6996
B) Examples
g) Melting temperature and degree of crystallinity: Melting temperature Tm, crystallization temperature Tcr, and the degree of crystallinity were measured with Mettler TA820 differential scanning calorimetry (DSC) on 5 to 10 mg, typically 8±0.5 mg samples. Both crystallization and melting curves were obtained during 50K/min cooling and heating scans between −70 C and 170° C. Melting and crystallization temperatures were taken as the peaks of endotherms and exotherms. The degree of crystallinity was calculated by comparison with heat of fusion of a perfectly crystalline polyethylene, i.e. 290 J/g.

h) Degree of crosslinking (Gel Content): Degree of crosslinking was measured by decaline extraction (Measured according to ASTM D 2765-01, Method A) on the crosslinked material.

i) Compression set: Compression set is a typical way to measure elasticity of the material. Compression set was measured according to ISO 815-1:2010-9. A plaque of the studied material is compressed at 25% for 24 hours at a given temperature. After that, the compression is removed and the material is let to relax 30 min at RT. The difference in height (set) is measured and reported in %.

j) Glass transition temperature: Tg is determined by dynamic mechanical analysis according to ISO 6721-7. The measurements are done in torsion mode on compression-moulded samples (40×10×1 mm3) between −100° C. and +150° C. with a heating rate of 2° C./min and a frequency of 1 Hz.

k) Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

l) Degree of crystallinity: the degree of crystallinity was measured with Mettler TA820 differential scanning calorimetry (DSC) on 5 to 10 mg, typically 8±0.5 mg samples. Crystallization curves were obtained during 50° C./min cooling and heating scans between −70° C. and 170° C.

EXAMPLES

The following Examples are included to demonstrate certain aspects and embodiments of the invention as described in the claims. It should be appreciated by those of skill in the art, however, that the following description is illustrative only and should not be taken in any way as a restriction of the invention.

TABLE 1

Materials used in the polymer compositions

| Materials | Manufacturer/Supplier |
|---|---|
| Queo 2M137[1] | Borealis AG |
| Queo 6200[2] | Borealis AG |
| Engage 8842 | DOW |
| VTMS | Evonik resource efficiency GmbH |
| CatMB SA | Borealis AG |

All commercially available materials refer to these materials available from the manufacturer in July 2018. [1]Commercially available as Queo 7001LA as of July 2018; [2]Not commercially available.

Example 1 (Ex1)

Plastomers were prepared by mixing and grafting the polymer (Queo 2M137) with various amounts of vinyl trimethylsiloxane (VTMS) and peroxide and reacting them in a co-rotation twin screw extruder at 200° C. temperature with a residence time of 60 seconds, to obtain a grafted resin (see table 4).

As the weight percent of VTMS is increased, the gel content of the polymer composition also increases.

Compression set test specimens were made from tapes by compression moulding the tapes into a plaque. Tape samples were produced on a Collin extruder (Teach-Line E20T) with a temperature profile of 120-130-140° C., a thickness of 2 mm and a width of 40 mm. The materials were dry blended (mixed) with 4% CatMB SA and then extruded into tapes.

Plaque pressing was carried out using the non-cross-linked tapes to get a thickness of 6 mm for the compression set measurements. After pressing the plaques, they were placed in hot water at 50° C. for 24 h to get them fully cross-linked. The gel content of the cross-linked plaque was subsequently measured before compression set measurement using the method described above.

Figure 1:
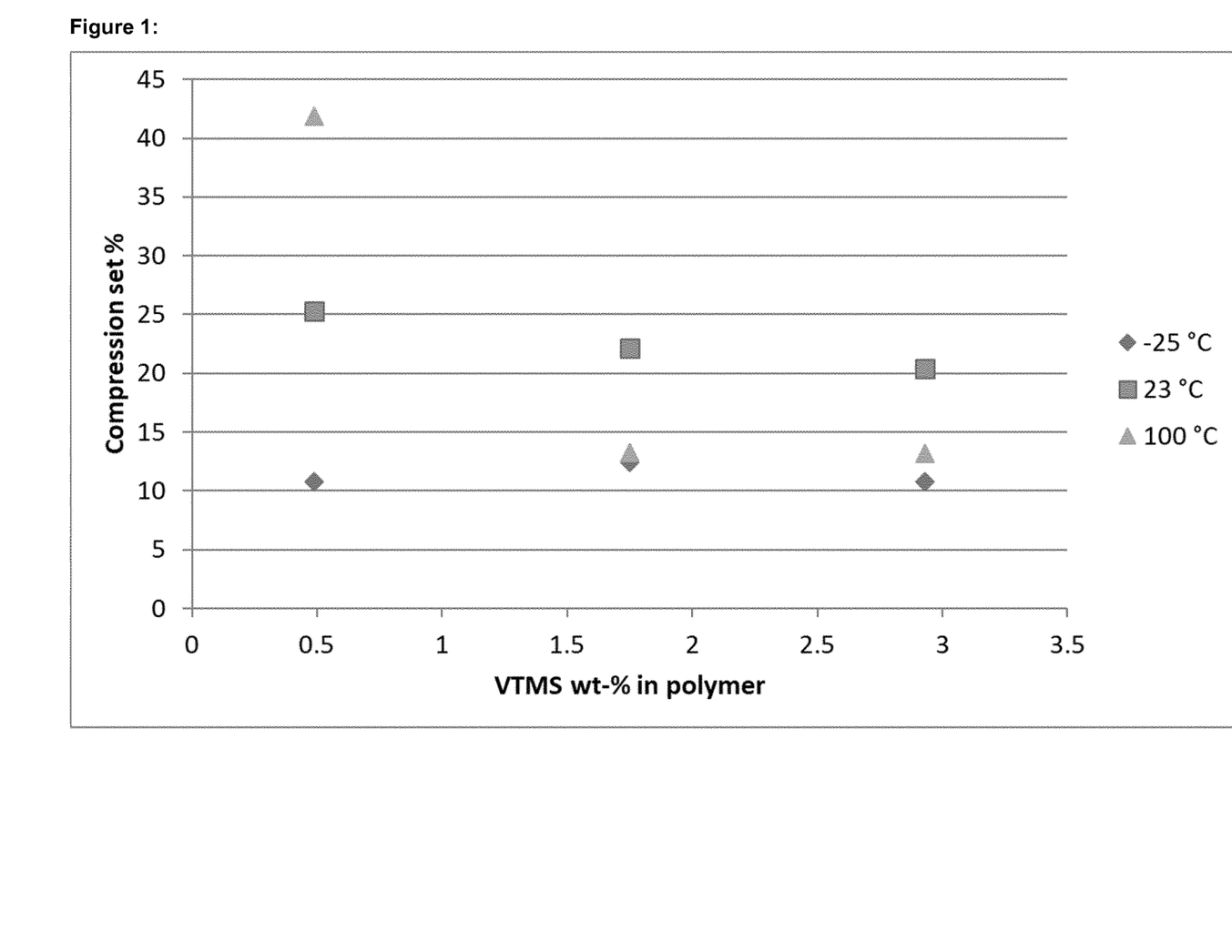
FIG. 1: Correlation of VTMS wt. % in the polymer composition with compression set % over a range of temperatures, corresponding to example 1 (values shown in table 4).
Figure 2:
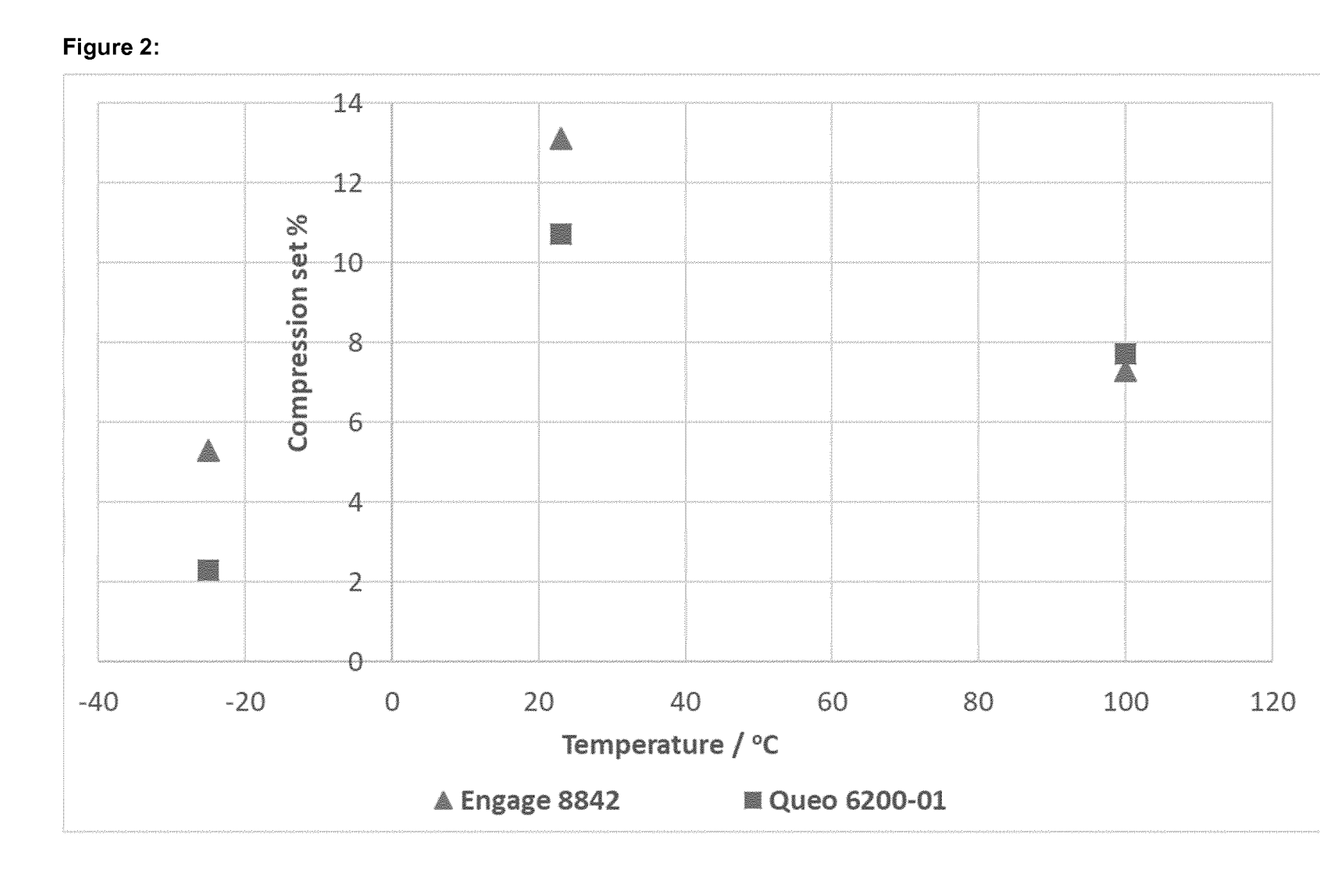
FIG. 2: Comparison of the compression set properties of 2 different base resins at temperatures from −23° C. to 100° C. corresponding to example 2 (values shown in table 5).

The compression set-% results for the plastomers in example 1 are shown in FIG. 1.

TABLE 4

Gel content of samples containing Queo 2M137 after grafting and cross-linking with different quantities of VTMS.

| Example | Vinyl trimethylsiloxane/ % w/w | Density/ Kg/m$^3$ | Gel content/ % w/w |
|---|---|---|---|
| 1.1 | 0.5 | 874.4 | 71 |
| 1.2 | 1.8 | 877.3 | 94 |
| 1.3 | 2.9 | 880.1 | 93 |

TABLE 2

Properties of the raw ethylene copolymers

| Material | Base polymer | Comonomer | MFR$_2$ g/10 min | Density Kg/m$^3$ | NMR-C$_8$/wt. % | Tg/° C. | Crystallinity/ % |
|---|---|---|---|---|---|---|---|
| Queo 2M137 | Ethylene | 1-octene | 1 | 870 | Ca. 32 | −49.8 | Ca. 16.9 |
| Queo 6200 | Ethylene | 1-octene | 0.5 | 862 | 36 | −57 | Ca. 7.0 |
| Engage 8842 | Ethylene | 1-octene | 1 | 857 | 39.2 | −58 | Ca. 9.4 |

TABLE 3

Unsaturation levels of the raw ethylene polymers

| | NMR [C = C/100 kCHn] | | | | | | | |
|---|---|---|---|---|---|---|---|---|
| Material | RR(C = CH2) vinylidene | R-CH = CH2 vinyl | R-CH = CHRR Trisubstituted vinylene (tris) | E-RHC = CHR cis | Z-RHC = CHR trans | Total | cis: trans | Vinyl groups/Total unsaturated groups |
| Queo 6200 | 13.1 | 8.2 | 18.8 | 6.5 | 2.2 | 48.9 | 2.95 | 0.17 |
| Engage 8842 | 0.9 | 5.4 | 0 | 0 | 1.7 | 7.9 | 0 | 0.68 |

Example 2 (Ex2)

Two different base resins, Queo 6200 and Engage 8842 were grafted with approximately the same amount of silane. Engage contains 3.5 wt. % more 1-octene derived units compared to Queo 6200. Compression set testing was carried out in an analogous manner to that described for example 1 (see above).

As may be seen, Queo has lower comonomer content compared to Engage. However, the very low, almost negligible crystallinity of Queo makes it very elastic also at low temperatures where all chains which are able to crystallise, will crystallise. At 100° C. there is no difference in the elasticity of Queo and Engage, because all crystals are molten.

TABLE 5

Compression set properties of the examples according to the present invention.

| Example | Base resin | Silfin 24 wt. % in feed | Density kg/m³ | NMR-VTMS wt. % | NMR-VTMS VTMS/kCbb | NMR-C₈ wt. % | Compression set -25° C. | Compression set 23° C. | Compression set 100° C. | Gel content wt. % |
|---|---|---|---|---|---|---|---|---|---|---|
| Example 2.1 | Queo 6200 | 2.91 | 864.2 | 1.76 | 2.38 | 38.5 | 2.3 | 10.7 | 7.7 | 95.7 |
| Comparative example 2.2 | Engage 8842 | 2.9 | 864.7 | 2.17 | 3.07 | 41.9 | 5.3 | 13.1 | 7.3 | 96.7 |

The invention claimed is:

1. An article comprising:
    a polymer composition,
    wherein the polymer composition is obtained by grafting an ethylene copolymer with comonomer units comprising hydrolysable silane groups, and
    wherein, the polymer composition has an amount of more than 0.5 wt. % of the comonomer units comprising hydrolysable silane groups, based on the total weight amount of monomer units in the polymer composition,
    wherein the said ethylene copolymer comprises alpha-olefin comonomer units having from 6-12 carbon atoms, and
    wherein the said ethylene copolymer is characterized as having:
    a density of from 840 to 890 kg/m³,
    wherein the ratio of cis to trans groups in the ethylene copolymer is greater than 1, and
    a total unsaturation of from 20 to 100 unsaturated bonds per 100,000 CH$_n$ groups.

2. The article according to claim 1, wherein the ethylene copolymer comprises from 10 wt. % to 50 wt. % of alpha olefin comonomer units having from 6 to 12 carbon atoms based on the total amount of monomer units in the ethylene copolymer (as determined using NMR).

3. The article according to claim 1, wherein the alpha olefin comonomer units are selected from 1-octene or 1-hexene.

4. The article according to claim 1, wherein the ratio of vinyl groups to total unsaturated groups in the ethylene copolymer is less than 0.6.

5. The article according to claim 1, wherein the ethylene copolymer has a crystallinity between 5 and 8% when measured by DSC using 50° C./min cooling and heating rates.

6. The article according to claim 1, wherein the polymer composition comprises further polymer components.

7. The article according to claim 1, wherein the polymer composition has been cross-linked after forming the article by hydrolysing the silane groups in the presence of a silanol condensation catalyst (SCC).

8. The article according to claim 7, wherein after cross-linking the article has a compression set (ISO 815-1:2010-9 at -25° C.) of from 0% to 5% when measured at -25° C.

9. The article according to claim 7, wherein after cross-linking the article has a compression set (ISO 815-1:2010-9 at 23° C.) of from 0 to 20%, when measured at 23° C.

10. The article according to claim 7, wherein the composition after crosslinking has a gel content of from 75% to 99%.

11. The article according to claim 7, wherein the ethylene copolymer has an MFR₂ (ISO 1133; 190° C.; 2.16 kg) in the range of from 0.01 to 5.0 g/10 min.

12. The article according to claim 7, wherein the silanol condensation catalyst (SCC) used in the cross-linking step is a sulphonic acid.

13. The article according to claim 12, wherein the silanol condensation catalyst is an aromatic organic sulphonic acid comprising the structural element:

$$Ar(SO_3H)_x \qquad (IV)$$

wherein Ar is an aryl group which may be substituted or non-substituted, and if substituted, then substituted with at least one hydrocarbyl group comprising up to 50 carbon atoms, and wherein x is at least 1;
or wherein said structural element is a precursor of the sulphonic acid of formula (IV) including an acid anhydride thereof or a sulphonic acid of formula (IV) that has been provided with a hydrolysable protective group.

14. A process for the production of the article according to claim 1, the process comprising the steps of:
    a) providing an ethylene copolymer,
    wherein the ethylene copolymer comprises alpha-olefin comonomer units having from 6-12 carbon atoms,
    wherein the ethylene copolymer is characterized as having:
    a density of from 840 to 890 kg/m³,
    wherein the ratio of cis to trans groups in the ethylene copolymer is greater than 1, and
    a total unsaturation of from 20 to 100 unsaturated bonds per 100,000 CH$_n$ groups,
    b) obtaining a polymer composition by grafting comonomer units comprising hydrolysable silane groups into the ethylene copolymer with a grafting agent to obtain a polymer composition with from 0.5 wt. % to 10 wt. % comonomer units comprising hydrolysable silane groups, c) blending the silane grafted polymer composition from step b) with a silanol condensation catalyst, d) forming the composition from step c) into an article.

15. The process according to claim 14, wherein after step d) the article is cross-linked in the presence of water, to obtain a gel content (measured according to ASTM D 2765-01, Method A) of 75% to 99%.

* * * * *